United States Patent [19]

Bisi

[11] Patent Number: 4,560,174
[45] Date of Patent: Dec. 24, 1985

[54] MULTI LIP SEAL
[75] Inventor: Ugo Bisi, Ferrara, Italy
[73] Assignee: Berco S.p.A., Italy
[21] Appl. No.: 557,210
[22] Filed: Dec. 2, 1983
[51] Int. Cl.$^4$ .............................................. F16J 15/34
[52] U.S. Cl. ...................................... 277/92; 277/96.1
[58] Field of Search .......................... 277/83, 92, 96.1; 384/138

[56] References Cited
U.S. PATENT DOCUMENTS

| | | | |
|---|---|---|---|
| 3,266,269 | 8/1966 | Stokely | 384/138 |
| 3,560,059 | 2/1971 | Miyake | 277/92 |
| 4,209,204 | 6/1980 | Wagner et al. | 277/92 |
| 4,445,695 | 5/1984 | Wilkinson | 277/96.1 |

Primary Examiner—Robert I. Smith
Attorney, Agent, or Firm—Allegretti, Newitt, Witcoff & McAndrews, Ltd.

[57] ABSTRACT

A novel seal means is positioned between two coupled mechanical parts rotating about a pin, the pin being connected to one part and rotating within a bushing connected to the other part with pin and bushing. The seal means comprises an elastic load ring of relatively soft material and a seal ring of "L"-shaped cross section made from tough abrasion resistant material and having at least two seal projections engaging the bushing for retaining lubricant and for preventing dirt from adversely affecting the operation of the seal means. In one embodiment, a hard back up ring, made for example from metal or rigid plastic, is supported in an annular seat in the seal ring for reinforcing the seal ring. The seal means may be employed as end face seals in a track joint for an endless chain for a crawler tractor.

13 Claims, 6 Drawing Figures

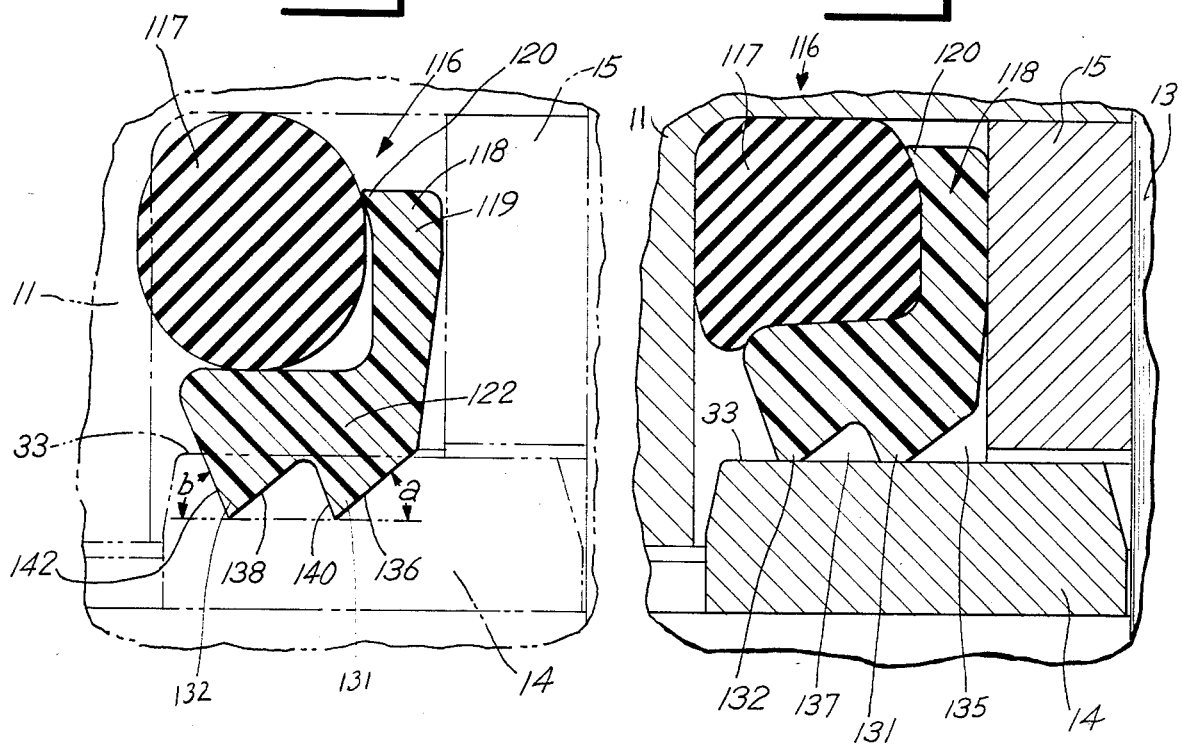
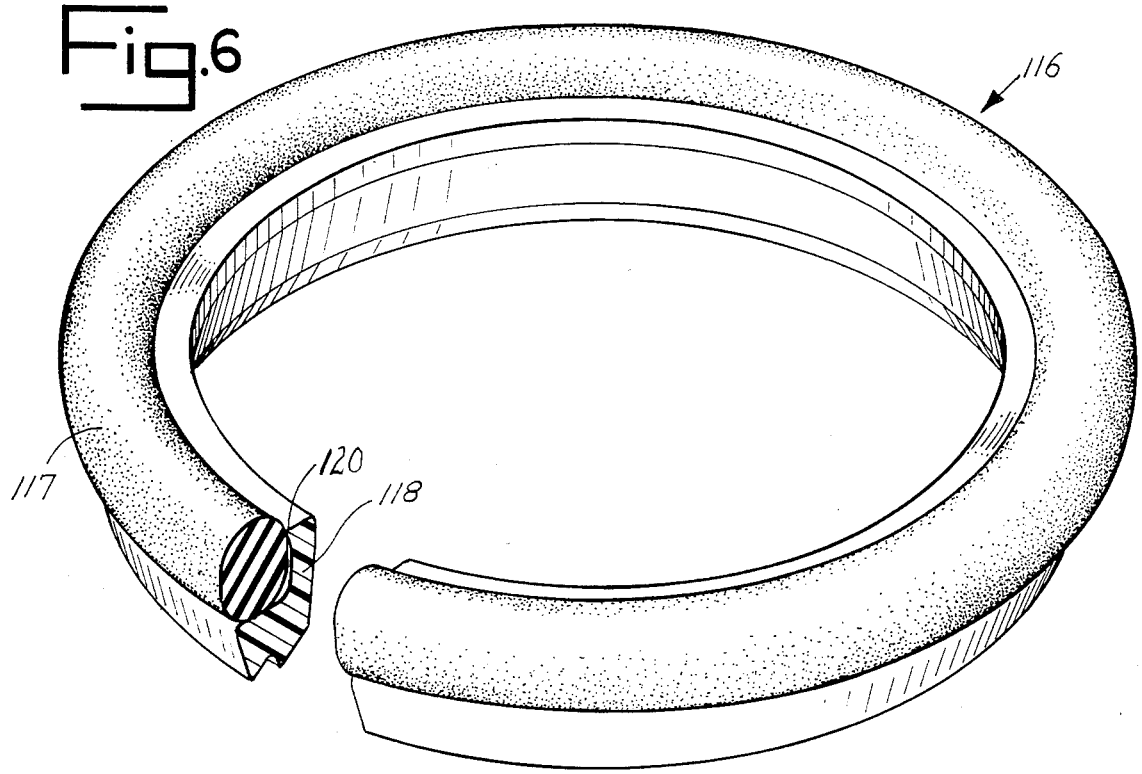

MULTI LIP SEAL

BACKGROUND OF THE INVENTION

This invention relates to improved seal means and more particularly to an improved end face seal means having extended service life for use in a severe service environment, such as a track joint for an endless chain for a crawler tractor.

Track chains operate in extremely abrasive environments and the track joints may be exposed to dust, mud, sand or rock at both cold temperatures as may be found in the arctic regions and hot temperatures as may be found in deserts. The end face seal performs its primary sealing function by mating precisely with and sealingly engaging with the end faces of their associated bushings and because the annular seal rings themselves are accurately positioned and maintained under axial face load by an elastomeric load. It is intended that an effective seal will retain oil within the track joint and will prevent dirt, mud, etc. from entering the track joint.

Among the pertinent prior art patents are Reinsma U.S. Pat. No. 3,390,922 and Reinsma U.S. Pat. No. 3,841,718. Both patents show crescent shaped seal rings in combination with load rings. In U.S. Pat. No. 3,390,922, an O-shaped load ring was employed. This seal purportedly did not work well over widely varying temperature conditions. The seal of U.S. Pat. No. 3,841,718 comprised two thick flanges jointed by a thin hinge section. The load ring was constructed in a canted polygonal shape. The seal did not have sufficient rigidity in cross section to prevent radial and circumferential buckling of the sealing surface of the seal during rotation thereof under load, particularly in larger sizes under heavy loads.

Several seals have been proposed comprised of two members, a first annular part generally L-shaped in cross-section and an annular elastomeric member or load ring. Morley et al. U.S. Pat. No. 4,095,516 shows a L-shaped polyurethane rubber seal with a load ring made from a relatively soft synthetic rubber that is generally parallelogram-shaped in an unstressed condition. Wagner et al. U.S. Pat. No. 4,209,204 discloses a similar seal assembly which includes a relatively rigid annular seal L-shaped in cross section and a pliant annular load ring. Reinsma U.S. Pat. No. 4,331,339 pertains to an end face seal assembly including two components. First, there is a seal ring L-shaped in cross section and made from a thermoplastic resin consisting of a polyamide polymer and a ultra-high molecular weight polyethylene. Second, the seal includes a load ring constructed of an elastomeric resilient material, for example, rubber, and that is of a generally parallelogram shaped configuration.

An object of the present invention is to provide an improved seal means that will function over a wide range of operating conditions, has long life, and is relatively inexpensive to fabricate.

Another object of the present invention is to provide a seal means adapted to be used in particularly demanding working conditions, especially between coupled mechanical parts subjected to an intermittent rotating movement about the same axis.

Yet another object of this invention is to provide multi lip end face seal means adapted to be fitted in the coupling or track joint between the links of a track of tracked vehicles, to prevent abrasive material, earth, sand and water from entering from without, and to seal lubricant within the coupling, such seal means comprising an elastomeric load ring and a seal having at least two lips engaging the face of a bushing in a track joint.

A further object of this invention is to provide multi lip seal means which possesses outstanding abrasion resistance and also considerable elasticity so as to ensure a good radial seal and a good axial seal.

Still a further object of this invention is to provide seal means with its parts held together so that the seal means can be installed readily and correctly without the use of special expedients.

To achieve the aforesaid objects and characteristics, the present invention embodies improved seal means fitted between two coupled mechanical parts rotating about one and the same axis, particularly for application to the tracks of tracked vehicles, characterized in that the seal means comprises an elastic load ring and a seal ring having an "L"-shaped cross section and featuring at least two sealing projections or sealing lips on the base of the L-shaped cross-section of the seal ring for sealingly engaging the face of the bushing. In one embodiment, the load ring is essentially trapezoidal in cross section. In another embodiment, the load ring is essentially circular in cross section.

BRIEF DESCRIPTION OF THE DRAWING

There is shown in the drawing presently preferred embodiments of the present invention wherein like numerals in the various views refer to like elements and wherein:

FIG. 4 is a cross-sectional view of the modified seal assembly installed between two half links of a track prior to compression thereof;

FIG. 5 is a cross-sectional view of the modified seal assembly of FIG. 4 installed between two half links of a track and in fully compressed position; and FIG. 6 is a perspective view, with parts broken away of the modified seal assembly.

DETAILED DESCRIPTION OF THE PRESENT INVENTION

Figure 1:
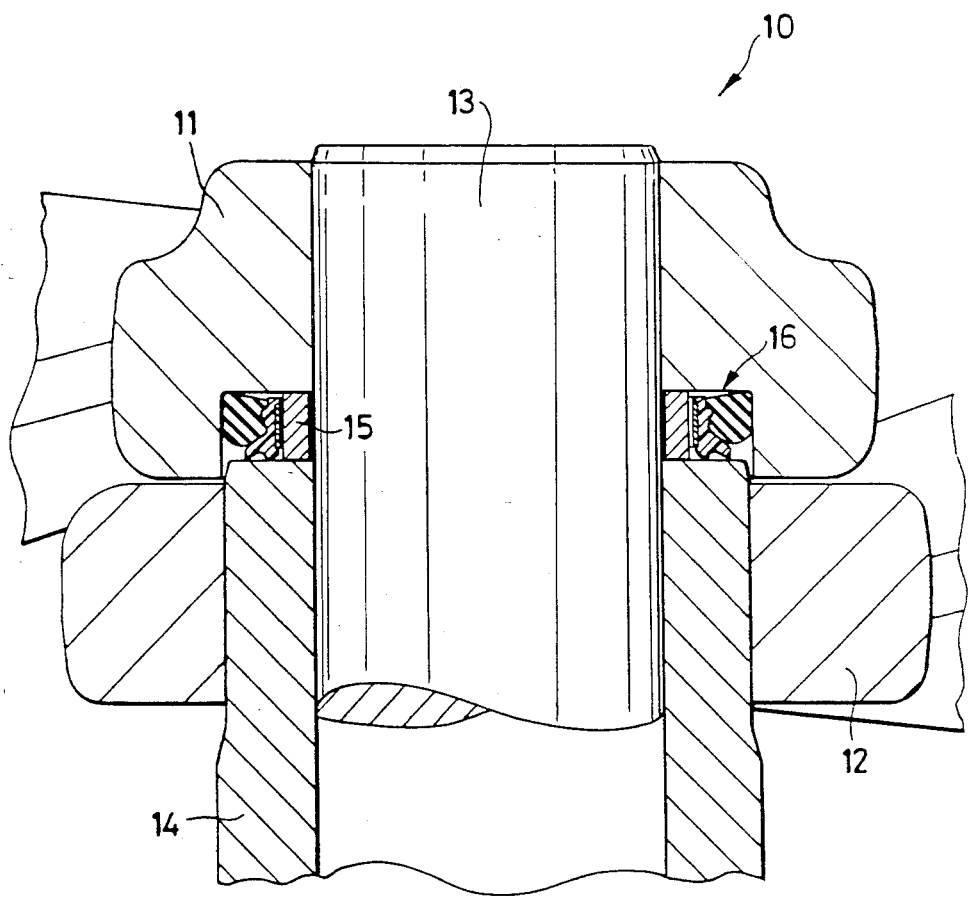
FIG. 1 is a partial sectional view of a coupling between two half-links of a track which are fitted with a seal assembly according to the invention.

With reference to FIG. 1 in a coupling 10, for example, of a track for track vehicles, there are coupled half-links 11 and 12 rotating about one and the same axis.

The half-link 11 rotates directly on a central pin 13 of the track, while the half-link 12 rotates on a bushing 14, which in turn rotates on the pin 13.

Between said bushing 14 and half-link 11 there are positioned in coaxial relation a spacer, or shim 15 and gasket, or seal means 16.

The seal means 16 (FIGS. 2 and 3) is composed of an elastic ring 17, and a seal ring 18 incorporating a rigid ring 19.

The elastic ring 17, of essentially trapezoidal section and made of highly yieldable material, for example a nitrile rubber ("Buna N"), or similar synthetic or natural rubber, has a circumferential recess 20 and coupling surfaces 21 and 22 in respect of the seal ring 18.

The elastic ring 17 also has a rounded upper surface 23 which couples with an annular radial surface 24 and an internal lateral surface of the half-link 11, which are interconnected.

The seal ring 18, which is essentially "L"-shaped in cross section and made of a tough abrasion-resistant polymer material, for example, polyurethane synthetic resin, features a series of projections and seal surfaces.

The "L"-shaped seal ring 18 has a flat top surface 26 from which on one side extend in succession a surface 27, a protruberance 28 and a surface 29.

On the other side, which is essentially smooth, the seal ring 18 has an annular cylindrical recessed seat 30 for the rigid reinforcement ring 19. On its lower side, the base of the "L"-shaped seal ring features an internal projection 31 and an external projection 32 which takes up position against an annular radial surface 33 of the bushing 14. The projections 31 and 32 provide double sealing lip means for sealing lubricant in the coupling and for preventing exterior abrasive material or dirt entering into the coupling.

The rigid ring 19 is positioned adjacent the external lateral surface 34 of the spacer or shim 15, said spacer or shim having annular surfaces 36, 37 in the region of the half-link 11 and the bushing 14. Preferably, the rigid ring 19 is made from metal or a rigid plastic.

The seal means or gasket 16 thus described is mounted, and operates, as follows:

After the bushing 14 bearing the half-link 12 has been fitted onto the pin 13, there are fitted the spacer or shim 15, the seal ring 18, the related rigid ring 19 and the toroidal elastic ring 17. There is then force-fitted on the pin 13 the half-link 11, which will form the coupling 10 when mounting is complete (FIG. 1).

Figure 2:
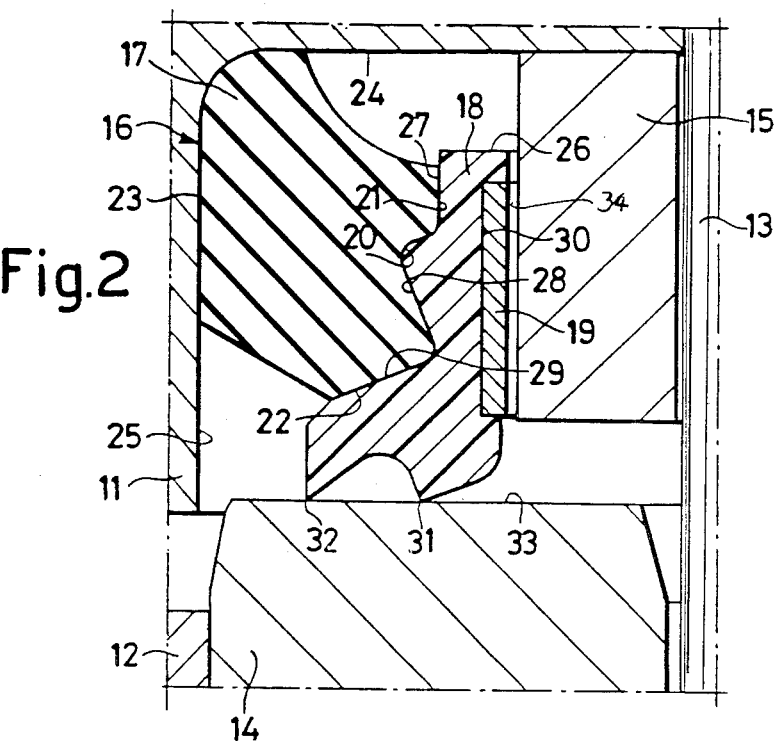
FIG. 2 is a cross-sectional view of the installed seal assembly and in a lightly compressed position.
Figure 3:
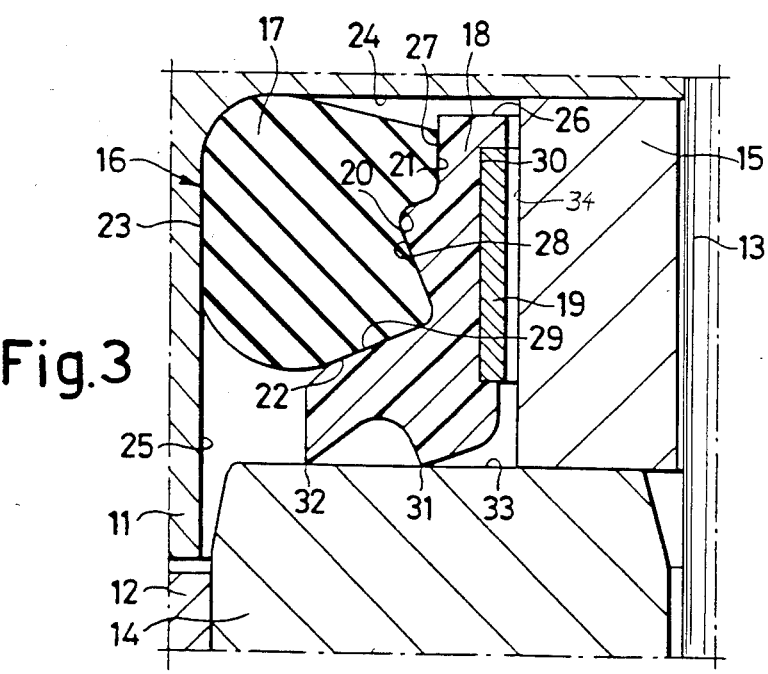
FIG. 3 is a cross-sectional view of the installed seal assembly similar to FIG. 2 and showing the seal in fully compressed position.

During a first stage of the forced fitting, when the seal means or gasket 16 is still in a rest position, the mounting appears as is shown in FIG. 2. When the half-link 11 has been fully forced onto the pin 13, the seal means or gasket 16 appears as shown in FIG. 3, fully compressed.

In effect, the upper surface 23 of the elastic ring 17, on deforming, adheres fully to the surfaces 24 and 25 of the half-link 11 and simultaneously brings the necessary compression to bear on the seal ring 18.

The elastic ring 17 and the seal ring 18 are perfectly coupled, such coupling being assured by the interaction of the recess 20 of the elastic ring 17 with the protruberance 28 of the seal ring 18, the surfaces of which are complementary.

The internal projecton or lip 31 of the seal ring 18 ensures that the lubricant is kept inside the coupled articulated elements, while the external projection or lip 32, concentric with the first, prevents external impurities from entering the sealing area which would deteriorate the coupling.

The rigid ring 19 fitted into the recessed seat 30 formed in the seal ring 18, provides a rigid reinforcement which makes it possible to use a seal ring made of abrasion-resistant material and possessing considerable radial and axial elastic characteristics.

The recess 20 and the protruberance 28 assure a perfect coupling between the elastic ring 17 and the seal ring 18 during the mounting operation.

The rigid reinforcement ring 19 to a considerable extent develops the so-called axial "memory" of the seal means, guaranteeing the seal function even in the event of marked axial displacements of the two articulations.

With reference to FIGS. 4, 5 and 6, there is shown a modification of the present invention. The seal means 116 comprises an elastic ring 117 and a seal ring 118. The elastic ring 117 is resilient and formed as an O-ring substantially circular in cross section in the relaxed state. As shown in FIG. 4, the ring 117 is slightly elliptical, with the longer axis being perpendicular to the radial surface or face 33 of bushing 14.

The seal ring 118 is essentially L-shaped section and made of tough abrasion-resistant material, such as, for example, polyurethane synthetic resin. The top or end section 119 of the seal ring 118 has a slight projection 120 for helping to retain the O-ring 117 assembled onto the seal ring 118 prior to assembly and during assembly into a coupling. Thus, projection 120 helps facilitate assembly of the seal means 116 into a track joint. The section or base 122 of the seal ring 118 features a pair of projections or lips 131, 132 which abut against an annular radial surface 33 of the bushing 14. In FIG. 4, there is shown the relaxed condition of the elastic ring 117 and seal ring 118, and in FIG. 5 there is shown the position of the elastic ring 117 and the seal ring 118 in an assembled coupling.

The surfaces 136 and 138 of lips 131 and 132 in one preferred example are formed at 40° to a transverse plane through the tips of the lips 131, 132. Stated somewhat differently, the surfaces 136 and 138 lie at an angle in this case 40° relative to a plane through the apexes of the lips 131, 132. The surfaces 140, 142, respectively, of lips 131, 132, respectively, lie at an angle which in one presently preferred form of the invention is 22° 30' with respect to a transverse plane through the tips or apexes of the lips 131, 132.

The section 119 tapers toward the base section 122 to provide sufficient elasticity and movement to better accommodate the lips 131 and 132 to the surface 33 of the bushing during normal operation, as well as when wear first begins. This feature helps prolong effective sealing life of the unique sealing means 116 of the present invention as compared with prior end face seal means for track joints.

In assembled condition, as shown in FIG. 5, the O-ring 117 is compressed and assumes the shape substantially as shown. A main force component urges the lip 132 toward the face 33 of bushing 14. Dirt that might enter between bushing 14 and link 11 is precluded from going further because of the firm engagement of lip 131 with the face 33 of the bushing 14. Lubricant in chamber 135 is retained by the firm engagement of lip 132 with the face 33 of the bushing 14. A component of force from the compressed O-ring 117 helps apply additional sealing force between lip 131 and the face of bushing 114. The space 137 between the lips 131 and 132 and the face 33 of the bushing 14 may entrap particles that penetrate the seal provided by lip 132 to help prolong the sealing life, but preferably particles are excluded because of the firm sealing of lip 132 against face 33 of bushing 14.

I have determined that the hardness of the load ring and of the seal ring are critical to attain maximum effective seal life. A particularly effective seal assembly results when the hardness of the rubber load ring 117 lies in the range Shore A 58 to 63 and the seal ring 118 lies in the range of Shore A 93 to 97.

FIG. 6 shows the seal assembly 116, with parts broken away to better illustrate the configuration of the load ring 117 and the seal ring 118. Prior to installation into a track joint, the load ring 117 is mounted onto the L-shaped seal ring 118 as illustrated. The load ring 117 is held in place by the projection 120 on the base 122 of the seal ring 118. The load ring 117 and seal ring 118 are assembled prior to installation and may be installed together into a track joint without special expedients.

The present invention provides multi-lip seal means for retaining lubricant in a track joint and for preventing dirt from adversely affecting the operation of the seal means. While a seal means with two sealing lips has been found very effective as an end face seal, it is contemplated that an additional sealing lip or sealing lips may be desirable for certain applications.

While I have shown presently preferred forms of the present invention, it will be apparent that the invention may be modified within the spirit and scope of the appended claims.

What is claimed is as follows:

1. A seal means for a track joint said seal means being adapted to be positioned in a chamber between two coupled mechanical parts rotating about a pin, said parts being movable axially with respect to one another, the pin being connected to one part and rotating within a bushing connected to the other part with pin and bushing, characterized in that the seal means comprises an annular elastic O-ring, and an annular seal ring of "L"-shaped cross section, said seal ring made of relatively stiff material having a hardness on the order of Shore A 93 to 97, said seal ring having a top section with a retainer projection at the extremity remote from the base facing the elastic ring for helping to retain the elastic ring on the seal ring, and having a base with at least two annular seal projections extending therefrom and adapted to engage the bushing for retaining lubricant in the chamber and for preventing dirt from entering the chamber and adversely affecting the operation of the seal means, said elastic O-ring being coupled to said seal ring for urging the seal projections toward the bushing and for maintaining the seal notwithstanding axial displacement of the mechanical parts toward and away from one another.

2. Seal means as in claim 1 wherein the seal projections extend equal distances from the base of the seal ring.

3. A seal means for a track joint, said seal means being adapted to be positioned in a chamber between two coupled mechanical parts rotating about a pin, said parts being movable axially with respect to one another, the pin being connected to one part and rotating within a bushing connected to the other part with pin and bushing, said seal means comprising an annular elastic O-ring, and an annular seal ring of "L"-shaped cross section being made of relatively stiff material, which is abrasion resistant and not readily attacked by lubricant, said seal ring having a base with at least two seal projections extending substantially equal distances therefrom and, said seal ring having a top section with a retainer projection at the extremity remote from the base facing the elastic ring for helping to retain the elastic ring on the seal ring, said seal projections being adapted to engage the bushing for retaining lubricant in the chamber and for preventing dirt from entering the chamber and adversely affecting the operation of the seal means, said elastic ring being coupled to said seal ring for urging the seal projections toward the bushing and for maintaining the seal notwithstanding axial displacement of the mechanical parts toward and away from one another.

4. Seal means as in claim 3 wherein the elastic ring is generally circular in cross section.

5. Seal means as in claim 4 wherein the elastic ring is elliptical in cross section.

6. Seal means as in claim 3 wherein the seal ring is constructed and arranged that in use the seal projections will be squared off relative to the bushing against which they are adapted to abut.

7. Seal means as in claim 3 wherein the elastic ring comprises a rubber-like material which has a hardness in the range of Shore A 58 to 63.

8. Seal means as in claim 7 wherein the seal ring has a hardness in the range of Shore A 93 to 97.

9. Seal means as in claim 3 wherein the top section tapers toward the base for providing sufficient elasticity and movement to accommodate the seal projections to the surface of the bushing.

10. Seal means as in claim 9 wherein the elastic O-ring is adapted to engage wall means defining the chamber and be deformed and compressed upon assembly, whereby in normal operation, the elastic ring is adapted to bias the base of the seal ring and the seal projections carried thereon toward the bushing for compressing the seal projections against the bushing and for maintaining the seal projections in engagement with the bushing during axial displacement of the mechanical parts as occurs in normal operation.

11. A seal means comprising an annular elastic O-ring and an annular seal ring of generally "L"-shaped cross section and being made of relatively stiff material, which is abrasion resistant and not readily attacked by lubricant, said seal ring having a bias with at least two annular seal projections, each forming substantially an apex in cross section, said apexes each extending substantially equal distances from the base, said seal ring having an annular top section with an annular projection at the extremity remote from the base facing the elastic O-ring for helping to retain the elastic ring on the seal ring.

12. A seal means as in claim 11 wherein the projections each have a flat surface at one side forming an angle of about 40° with a plane through the apexes of the projections.

13. A seal means as in claim 11 wherein in use, the elastic O-ring is compressed and is adapted to provide the force for urging the apexes into sealing engagement with a surface.

* * * * *